SIGNAL STORAGE CIRCUIT UTILIZING CHARGE STORAGE CHARACTERISTICS OF FIELD-EFFECT TRANSISTOR

Filed Oct. 13, 1964 2 Sheets-Sheet 1

*INVENTORS*
ARNOLD S. FARBER
CARL E. RUOFF

BY [signature]
ATTORNEY

United States Patent Office 3,461,312

Patented Aug. 12, 1969

3,461,312

SIGNAL STORAGE CIRCUIT UTILIZING CHARGE STORAGE CHARACTERISTICS OF FIELD-EFFECT TRANSISTOR

Arnold S. Farber, Yorktown Heights, and Carl E. Ruoff, Ossining, N.Y., assignors to International Business Machines Corporation, Armonk, N.Y., a corporation of New York Filed Oct. 13, 1964, Ser. No. 403,482

Int. Cl. H03k *17/02;* G11b *9/06*

U.S. Cl. 307—221 15 Claims

Figures 1, 1A:
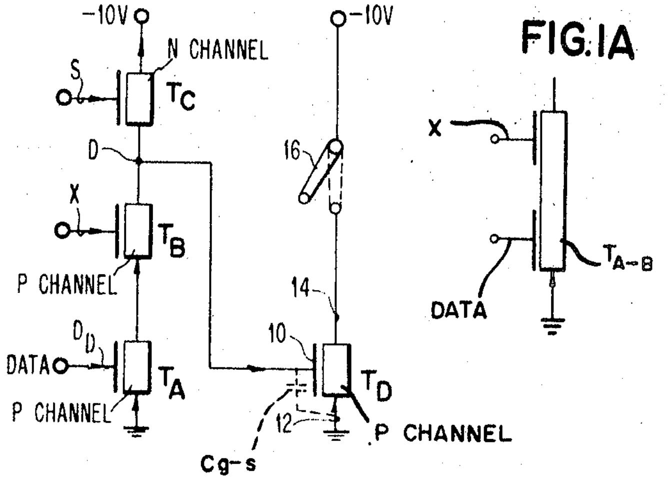

The present invention relates generally to signal storage circuits utilizing field-effect transistors and more particularly, to such circuits employed as shift registers utilizing the unique charge storage characteristics of such transistors.

The storage of information, especially binary information is a matter of paramount importance to computer designers. The ability to store binary data for long or short periods of time is an absolute necessity in the design of such machines. The long term or relatively permanent storage capability of such machines is normally in the form of magnetic toroids or thin film devices switchable between one or the other of their stable magnetic states which are indicated by remanent flux alignment within the device. Computer designers generally accept magnetic phenomenon as the best practical long term storage system and comparatively limited work occurs in this area; however, in the area of short term storage such as delay lines, shift registers and the like, continual design and development work is being done.

Shift registers as well as delay lines have been known for many years dating to the early electron tube computers. Shift registers in particular are used extensively in electronic computers for storing information, converting information from serial to parallel form and vice versa and the like. In general, shift registers include a plurality of interconnected components or stages wherein each stage usually includes a plurality of active and passive elements and conductors for connecting that element to other stages. Conventionally, a stage is required for each binary bit of information to be stored in the register. Known systems of this type have utilized, for example, magnetic cores, in which the polarity of the remanent magnetism is reversible by the action of a control or clock pulse thus causing the production or nonproduction of a pulse in a read out winding in response to an input pulse which effects the initial condition of magnetization. Crystal rectifiers have been used alternatively in place of the magnetic cores in which the presence or absence of free charge carriers has been used as a memory feature.

Alternatively, electrical trigger circuit arrangements are often used as memory elements and many comprise, for example, electron discharge tubes, point contact transistors or junction transistors. However, all of these circuits involve very high energy dissipation and thus large power supplies with attendant heat problems especially where many hundreds of such registers would be used in a computer process unit.

Other devices, and these are the more common type, utilized capacitors as storage elements for charging with a given voltage and a plurality of switching circuits constructed of electron tubes or transistors for charging and discharging said capacitors in accordance with the reception of system clock pulses and data whereby the shifting of binary bits from one stage to another is accomplished. However, these circuits similarly require relatively large power supplies and also a considerable number of both active and passive circuit components to achieve the desired storage.

Modern computer design concepts lean more and more to devices and circuits which suit themselves to mass fabrication techniques. Current circuits utilizing both active and passive elements may be batch fabricated, however, the processes are quite involved due to the many different devices it is desired to make.

It has now been found that the gate to source capacitance of field-effect transistors may be utilized to form an electric signal storage circuit and more particularly, to fabricate a novel storage circuit which can be utilized for producing a reliable low cost shift register. Two unique properties of the insulated gate field-effect transistor which make this circuit particularly suitable are the high input impedance to the gate and, as stated previously, the large gate to source capacitance which is capable of storing voltages for periods up to fifteen minutes. Utilizing such field-effect transistors, a shift register stage may be constructed having a minimum total number of components and devoid of any passive circuit elements.

It is accordingly a primary object of the present invention to provide a storage element for binary data utilizing field-effect transistors.

It is a further object to provide such a storage device capable of storing a binary signal without passive circuit elements.

It is yet another object of the present invention to provide a shift register constructed exclusively of field-effect transistors.

It is a further object to provide such a field-effect transistor shift register which is particularly adapted to mass fabrication and integrated circuit design.

The foregoing and other objects, features and advantages of the invention will be apparent from the following more particular description of preferred embodiments of the invention, as illustrated in the accompanying drawings.

Figure 2:
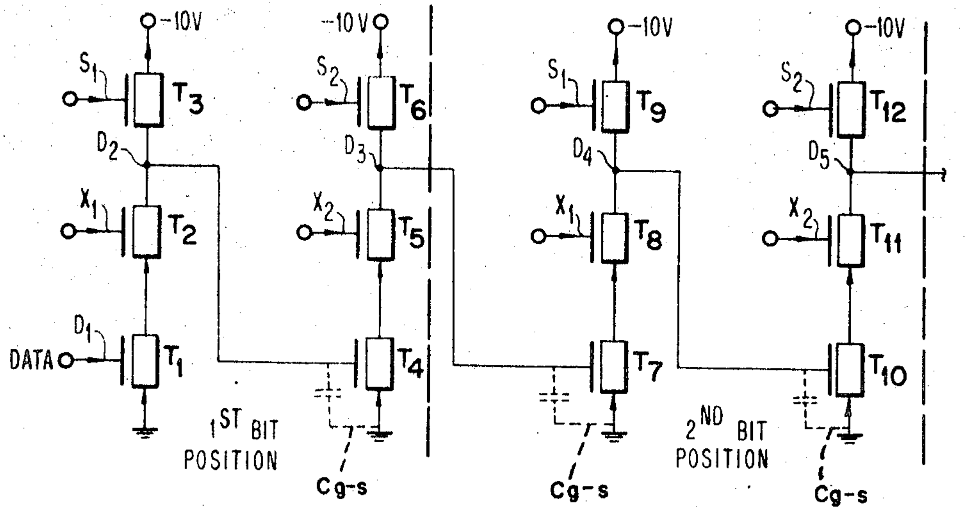
Figure 4:
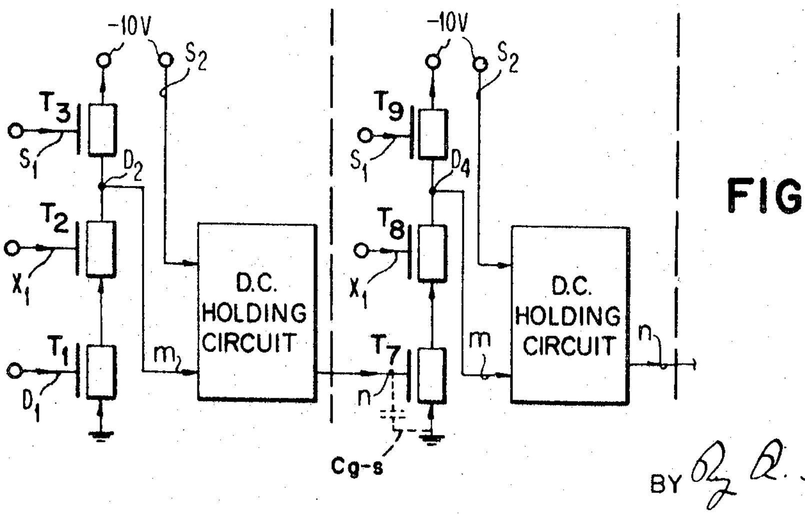
Figure 3:
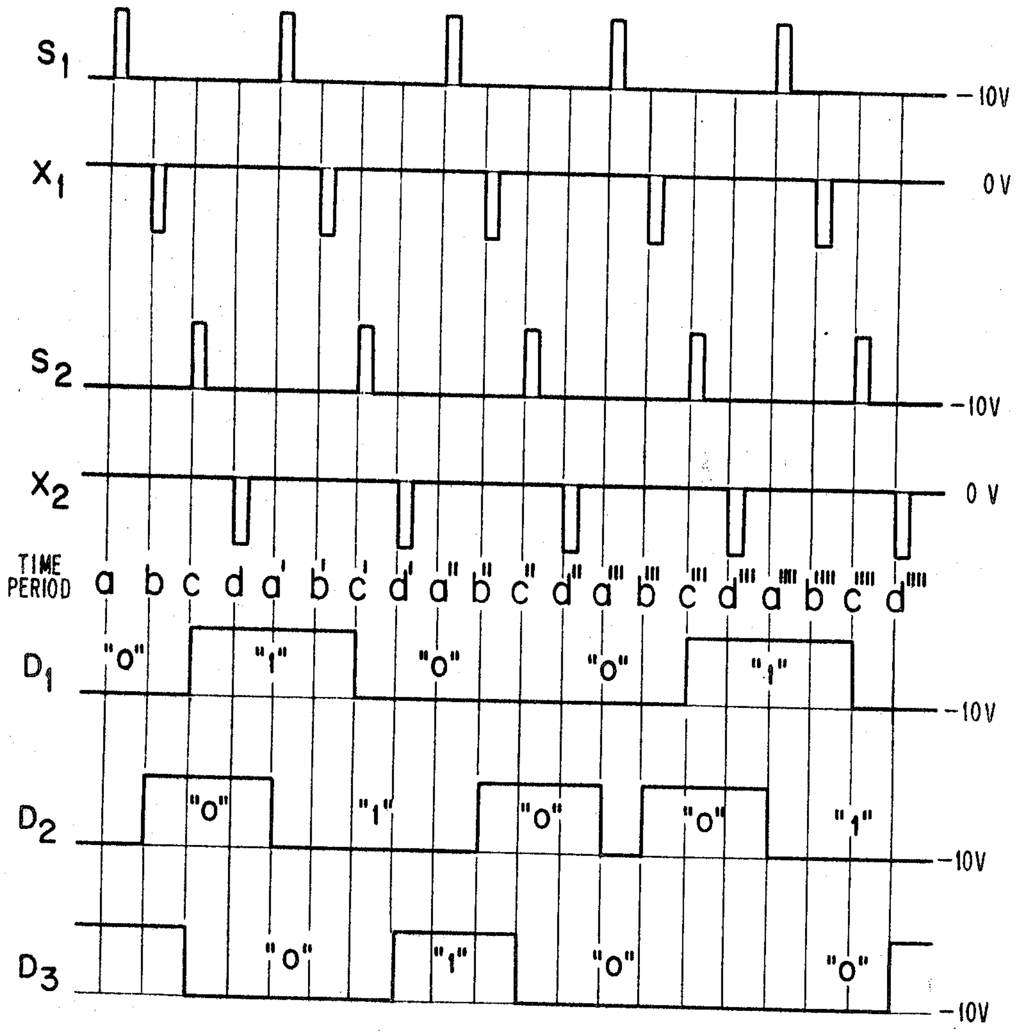

In the drawings:

FIGURE 1 is a schematic diagram of a single signal storage circuit constructed solely of field-effect transistors, FIGURE 1A illustrates a single split-gate transistor replacing two transistors of FIGURE 1, FIGURE 2 shows two bit storage stages of a shift register constructed in accordance with the teachings of the present invention, FIGURE 3 is a set of curves showing the system clock pulses and data pulses propagated through the stages of the shift register shown in FIGURE 2, and FIGURE 4 shows a shift register constructed similarly to that of FIGURE 2 but wherein the even numbered half stages have been replaced by D.C. holding circuits to provide long term storage.

The objects of the present invention are accomplished in general by an electrical signal storage circuit comprising three series connected field-effect transistors. A fourth field-effect transistor has its gate directly connected between the second field-effect transistor and the third field-effect transistor. Means are provided for selectively connecting said fourth field-effect transistor to a suitable bias source and to detect the conductive state of said fourth field-effect transistor. First clock pulse means periodically render said third field-effect transistor conductive and subsequently additional means applies a data signal to the gate of the first field-effect transistor. Second clock means are provided for producing a pulse which is non-coincident with said first closk means to render the second field-effect transistor conductive coincident with the application of said data signal to the gate of said first field-effect transistor.

The above circuit utilizes the capacitance at node D to store the signal for extended periods of time. This capacitance is primarily composed of the gate to source capacitance of the fourth field-effect transistor. The third transistor is effective under control of a clock pulse to initialize the storage circuit, that is, store a first electrical charge thereon from the circuit bias source and the first transistor is the data input transistor and is rendered conducting or non-conducting depending upon the input data signal condition. The second transistor provided with the second clock pulse is, in essence, a sampling and isolating switch which causes the signal stored upon the gate to source capacitance of said fourth field-effect transistor to be shunted to ground if the data signal has rendered the first field-effect transistor conductive. It will be apparent that the second field-effect transistor could be deleated if it were not necessary to isolate the signal stored on the fourth transistor. In the shift register embodiment shown in FIGURE 2, the second transistor is necessary for the device to perform shifting operations as will be apparent from the subsequent description.

The field-effect transistor per se and the fabrication of same forms no part of the present invention. A relatively large number of articles have been published on the field-effect transistor describing the characteristice of various devices fabricated from different materials as well as details of a number of different fabrication techniques. One such article appears in the Digest of Technical Papers for the Solid State Circuits Conference, February 1963, and is entitled "Nanowatt Logic Using Field-Effect Metal-Oxide Semiconductor Triodes," by Wanlas and Sah, on page 32. Stated generally, the source, gate and drain elements of the field-effect transistor correspond generally in function to the emitter, base and collector elements respectively of the standard transistor and perform in substantially the same manner. The primary characteristic of the field-effect transistor which lends itself to the building of storage circuits without the use of secondary storage device is the gate to source capacitance which averages approximately 3 picofarads. This capacitance is shown as cg.-s in the drawings. This plus the fact that the field-effect transistor is a planar device and ideally lends itself to mass fabrication production techniques and integrated circuit design makes the present circuits using such transistors especially valuable.

The storage circuit does not require any passive devices such as resistors, capacitors, inductors, etc., but only the active elements or field-effect transistors themselves and direct connections between the transistors and to the power supplies as indicated. This basic signal storage circuit may obviously be used in a number of differen applications where it is desired to store binary signal information.

It has particular utility in the shift register configuration specifically set forth in FIGURE 2. In this register a plurality of the basic storage circuits are utilized. Each group of three, series connected field-effect transistors comprises a half stage of the serial shift register. However, in this instance the fourth field-effect transistor set forth in the above general description of the basic storage circuit becomes the first transistor of the subsequent half stage or group of three transistors. Thus, the first group of three transistors receives a data signal from an external source and all subsequent groups making up half stages of the register receive their input signal from the junction between the second and third field-effect transistors of the preceding half stage. The specific operation of this register will be set forth more particularly subsequently with particular reference to FIGURES 2 and 3.

Generally, each register half stage comprising three series connected field-effect transistors as set forth above are arranged in pairs comprising even and odd numbered half stage circuits. Two such half stages are required for each bit position, an even and an odd numbered half stage. As will be explained more fully subsequently, the odd numbered half stages all receive a reset and sampling pulse from a first clock generator means and all of the even numbered stages receive a reset and sampling pulse from a second clock generator means.

The term "transistor" as used previously and subsequently in the specification when referring to either the signal storage circuit per se or to the shift register embodiment is intended to imply a field-effect transistor in all instances unless the contrary is clearly stated. Also, the term "stage" as used herein in referring to the sections of the shift register is intended to mean that portion of the shift register utilized to store or to constitute a single register bit position. Each such stage, as stated previously, is made up of two half stages, each of which receives separate and distinct clock pulses.

The shift register embodiment of the invention as disclosed in FIGURE 2 similarly requires no passive circuit elements and a minimum of active elements to constitute a complete register stage. Prior art shift register stages made up of, for example, D.C. logic blocks, require up to sixteen separate transistors to perform the same logic functions. The obvious advantage of this reduction in number of components is that a circuit so constructed will be clearly lower in cost since it requires fewer components. Additionally, small volume will be required to construct a register having an extremely large quantity of storage capacity. Further, with fewer components much lower power will be required. This is especially true in view of the fact that no D.C. current, as such, ever flows in the circuit other than that necessary to charge or discharge the gate to source capacitance of the storage transistor as set forth.

Further and perhaps even more important is the fact that the field-effect transistor is essentially a planar device and is ideally suited to both miniaturization and mass fabrication techniques which, of course, include concepts of integrated circuit technology where a great many devices can be fabricated in a single operation. Although the details of fabricating a field-effect transistor form no part of the present invention, it should be noted that an entire shift register constructed in accordance with the teachings of the invention could be fabricated on a single substrate with various masking and doping operations and depositing of insulative layers and conductive strip lines. The resultant structure is both compact and inexpensive to manufacture on a cost per element basis.

In addition to being usable as a shift register per se, the circuit has been successfully utilized to replace much more bulky and expensive magnetostrictive delay lines for short term storage. The amount of delay possible with the device is very great since as stated, each stage will successfully store a charge for extended periods of time. Therefore, for all practical operating conditions, the primary limitation on the amount of bit delay between steps would be based upon the input bit repetition rate or sampling frequency which means that bits must be stepped along in the register so that new bits may be received and entered properly.

It should be noted that the first two transistors in each of the half stages form what is essentially an AND circuit and may utilize a split-gate structure which has been reported in recent technical articles. One such article describing such a structure appears in the June 1964 IBM Technical Disclosure Bulletin, vol. 7, No. 1, page 7, entitled "An AND Gate Using Single Field-Effect Transistor," by Brenneman and Tansal. The equivalent circuit for such a split-gate transistor is shown in FIGURE 1A. The function of these lower two transistors as shown in the FIGURES 1 and 2 is essentially an ANDing function since both have to be switched to a conductive state to alter the charge stored at the node point between the second and third transistors as will be clearly pointed out in the following specific description of these circuits.

Having thus generally described the invention and the advantages thereof, there will now follow a specific description of the circuits with reference to the drawings.

FIGURE 1 discloses a single storage circuit in which a binary "1" or a "0" may be denoted by the presence or absence of a charge on the gate to source capacitance of a field-effect transistor wherein the occurrence of said charge may be detected by examining the conductive state of said transistor by suitable switching means. This suitable control means might be any sort of a sampling switch which would periodically connect the storage transistor to a bias source. In FIGURE 1, transistor $T_D$ is the storage transistor having a gate 10, source 12 and drain 14. The sampling switch 16 is provided for connecting the transistor $T_D$ to the −10 volt source when it is desired to sample the conductive condition of a storage transistor $T_D$. As will be understood, if a negative signal is applied to the gate 10 of this P-channel transistor, the transistor will be rendered conductive by closing the sampling switch 16 and a current will flow through same. It will, of course, be obvious that any of many types of sampling circuits and devices could be used for sampling the condition of the transistor $T_D$ without actually causing current to flow in the bias circuit. One such alternative scheme is utilized in the shift register embodiment of FIGURE 2 as will be explained subsequently.

The manner in which a charge is stored on the gate 10 of the storage gate transistor $T_D$ is as follows. It will be noted that the gate is connected to the node D located between the two transistors $T_C$ and $T_B$. It will be noted that the transistors $T_A$ and $T_B$ are both indicated as P-channel types and the transistor $T_C$ as an N-channel type. Assuming now an initial condition of this circuit wherein the transistors $T_B$ and $T_A$ are both biased to cut off, the application of a positive pulse to the gate of transistor $T_C$ through line S will cause transistor $T_C$ to be rendered conductive. This will result in the node D being placed at the bias voltage of −10 volts as indicated in this drawing. When the positive pulse is removed from the gate of the transistor $T_C$, the −10 volt pulse is stored at the node D due primarily to the capacitive effect of the gate to source capacitance of transistor $T_D$. Further, this −10 volt charge will remain stored in the circuit at the point designated node D for extended periods.

Assume now that it is desired to test the data signal at the input $D_D$ to the gate of transistor $T_A$, a negative pulse is applied at the input X to the gate of transistor $T_B$. The applicaion of this negative pulse to the P-channel transistor $T_B$ now renders this transistor conductive or more specifically, capable of conduction. If the data input at this time is similarly negative, the transistor $T_A$ will also be rendered conductive and the negative charge stored at node D will be shunted directly to ground through $T_A$ and $T_B$, thus removing said charge. Thus, at some point subsequent to the removal of the negative pulse to the gate of the transistor $T_B$, testing the conductive condition of the transistor $T_D$ will indicate whether a negative pulse or a zero valued, i.e., ground pulse, is stored on the gate thereof at node point D. As stated previously, when a negative charge is stored, the transistor $T_D$ will conduct upon the application of a bias to the source-drain circuit. Conversely, if there is no negative charge at node D, the transistor will not conduct. It may thus readily be seen that subsequent to the resetting pulse applied at point S of transistor $T_C$ and the sampling pulse applied to input X to the gate of transistor $T_B$, the fact that the transistor $T_D$ is conductive indicates that there was no negative pulse applied to the data input $D_D$ to the gate of transistor $T_A$. And conversely, the non-conduction of the transistor $T_D$ will indicate that a negative signal input pulse was applied to the data input $D_D$ of the gate of transistor $T_A$.

It should be understood that the transistor $T_B$ could be dispensed with if the data signal is periodically sampled by some other means which would maintain transistor $T_A$ nonconductive in the absence of a sampling period. If this latter condition exists, it is not necessary to have the isolation-sampling transistor $T_B$. However, if the data input is essentially continuous as is the situation in the embodiment of FIGURE 2 where it is desired to use the instant storage circuit in a shift register, this isolation transistor is required to isolate the signal during various shifting operations.

Referring now specifically to FIGURE 2, there is shown a shift register constructed according to the teachings of the present invention. This embodiment shows four half stages, each half stage comprising three serially connected transistors which function the same as transistors $T_A$, $T_B$ and $T_C$ in FIGURE 1. It will be noted that field-effect transistors $T_1$–$T_6$ constitute the first bit position and transistors $T_7$–$T_{12}$ constitute a second bit position. It will be obvious to a person skilled in the art that to provide additional bit storage positions necessitates the addition of further six transistor units as exemplified. In each of the additional bit positions the first half stage consisting of three transistors would, of course, be provided with the reset and sampling pulses $S_1$ and $X_1$ and the second half stage would be supplied with the reset and sampling pulses $S_2$ and $X_2$.

The operation of the present shift register insofar as the function of each half stage is concerned is similar to other conventional serial shift registers. The first half stage of the first bit position performs the function of sampling the data. The first half stage of subsequent bit positions obtains data from the contiguous previous bit position. The second half stages act as holding or storage circuit for the particular electrical signal shifted to the first half stage of that particular bit position.

The shift register of the embodiment of FIGURE 2 requires essentially four separate time delayed pulse trains which might be considered a four-phase clock. The first two of these comprise the pulses designated by the inputs $S_1$ and $X_1$. The $S_1$ pulses, as indicated in the storage circuit embodiment of FIGURE 2, comprise reset pulses for the actual storage nodes $D_2$ and $D_4$. The pulse indicated by the input $X_1$ is a sampling pulse and is equivalent to the sampling pulse X of FIGURE 1. The reset pulses $S_2$ applied to the gates of transistors $T_6$ and $T_{12}$ are delayed from both pulses $S_1$ and $X_1$. It is the function of the pulse $S_2$ to reset the second half stages of each bit position prior to the sampling of the first half stage which signal is stored at the node points $D_2$, $D_4$, etc. The application of the $S_2$ pulse as stated, resets node points $D_3$ and $D_5$ by rendering transistors $T_6$ and $T_{12}$ conductive. This function is identical to the function of an $S_1$ pulse.

Next, the pulse $X_2$ is applied to the gates of the transistors $T_5$, $T_{11}$, etc. This pulse acts to sample the node points $D_2$ and $D_4$ of the first half stage and actually transfers this signal in inverted form to the node points $D_3$ and $D_5$. Thus, the application of the $S_2$ and $X_2$ pulses to the even half stage positions of the register shifts the signals stored at the node points $D_2$ and $D_4$, etc., of the odd half stages forward to the second half stage node points $D_3$, $D_5$, etc.

Referring now to FIGURE 3, typical pulse shapes for the pulses $S_1$, $S_2$, $X_1$ and $X_2$ are clearly illustrated in the first four curves of this figure. It will thus be seen, looking at the time base of the curves, that all four of these pulse trains are delayed slightly with respect to each other. That is, pulse $S_1$ is first, $X_1$ second, $S_2$ third and $X_2$ fourth. It will further be noted that the $X_2$ pulse occurs within the given cycle before the next $S_1$ pulse occurs. The necessity for this will be apparent since the signal stored in the first half stage must be transferred to the second half stage before the first half stage can be reset. Otherwise, the signal would be destroyed.

It will be noted that a given cycle time in which all four pulses $S_1$, $X_1$, $S_2$ and $X_2$ occur has been divided in quarters and indicated on the figure as *a*, *b*, *c*, *d*, *a'*, *b'*, *c'*, *d'*, etc. Thus, the first or odd number half stage resetting and sampling occurs at the time base points *a*, *b*; *a'*, *b'*; *a''*, *b''*; etc., while the resetting and sampling for the even numbered half stages in response to the $S_2$ and $X_2$ pulses occur at time base points *c*, *d*; *c'*, *d'*; *c''*, *d''*; etc. Only the voltage waveforms appearing at node points $D_1$, $D_2$ and $D_3$ are shown since those appearing at $D_4$ and $D_5$ are identical to $D_2$ and $D_3$ with the exception that they are, of course, delayed by one system cycle time. To indicate the information stored at he node points $D_1$ through $D_3$, binary "0's" and "1's" are indicated at certain points of these waveforms. It will be apparent from the figure that when a voltage of −10 volts appears at the data input line ($D_1$), a "0" is intended and conversely when a 0 voltage appears on the line, a binary "1" is present. Referring to curve $D_2$, it may be seen that there is an inversion which occurs in storing the signal in a half stage. However referring to curve $D_3$, the inverted signal is reinverted in the second half stage and the signal on node $D_3$ is in phase but delayed with respect to the signal at the input line $D_1$.

It should be noted that all of the curves indicate 0 or −10 volts as the voltage levels present at the vartious points in the circuit. It will be apparent that with the P-channel field-effect transistors shown, a −10 volt pulse causes current flow in the circuits and that a pulse 0 volts results in the shutting off of the transistors from the conductive state. The converse is true of the N-channel transistors. It will, of course, be apparent that other bias voltages and pulses may be utilized especially where it might be desired to utilize all N-channel, all P-channel or various combinations of the two. In this event, suitable bias voltages and pulse polarities would obviously be chosen with the same overall system operating characteristics.

Proceeding now with the detailed description of the circuit of FIGURE 2 with respect to the curves of FIGURE 3, it will be noted that just prior to point *a* on the time base of FIGURE 3, the data input line has a −10 volt signal thereon, node $D_2$ has a −10 volt signal thereon and node $D_3$ is substantially 0 volt. At point *a*, pulse $S_1$ causes transistor $T_3$ to become conductive thus connecting node point $D_2$ directly to the −10 volt bias source. However, since node point $D_2$ is already at −10 volts, there will be no change in the voltage at node point $D_2$. Upon the occurrence of timing pulse $X_1$ at point *b*, transistor $T_2$ is rendered conductive and since a negative signal is being applied at point $D_1$, transistor $T_1$ is likewise rendered conductive which results in the shorting of the −10 volts stored at point $D_2$ to ground. Therefore, at point *b* it will be noted that curve $D_2$ is indicated to rise to a 0 voltage level. At time period *c*, pulse $S_2$ is applied to transistor $T_6$ resetting node point $D_3$ to the −10 volts of the bias source and when $S_2$ goes off, a −10 volt signal is stored at point $D_3$. This is illustrated in FIGURE 3 at time point *c* wherein it will be noted that curve $D_3$ drops to −10 volts. At point *d*, pulse $X_2$ is applied to transistor $T_5$. $T_5$ is thus rendered conductive, however, at this point node $D_2$ has a 0 voltage thereon thus rendering transistor $T_4$ nonconductive. Therefore, the −10 volt signal stored at node $D_3$ upon the occurrence of pulse $S_2$ at point *c* remains stored at node $D_3$. Upon the occurrence of the $S_1$ pulse at time *a'*, node point $D_2$ is returned to its −10 volt state by the rendering conductive of the transistor $T_3$. At point *b'*, the occurrence of pulse $X_1$ has no effect on node $D_2$ since $D_1$ is at 0 volt at this point, therefore, rendering transistor $T_1$ nonconductive.

The same order of operations may be plotted indefinitely assuming an input signal consisting of a string of binary "1's" and "0's". For example, at point *b''*, on the occurrence of the pulse $X_1$, transistor $T_2$ and $T_1$ will be found to be conductive, therefore curve $D_2$ returns to a 0 voltage level at point *b''*. Similarly, at point *d'''*, the occurrence of pulse $X_2$ is ANDed with the signal at node point $D_2$ and it will be found that although the transistor $T_5$ is rendered conductive, transistor $T_4$ is cut off, therefore, the voltage at node point $D_3$ represented by the curve $D_3$ remains at −10 volts. Thus it will be apparent by examination of FIGURE 3 and the above description that data is shifted by one time period of the four phase clock consisting of pulses $S_1$, $X_1$, $S_2$ and $X_2$ between each stage of the shift register. It will further be apparent that as many shift register stages may be used as is desired. This addition of stages is, of course, limited by the ability of the pulse source to provide sufficiently strong pulses to gate all of the stages of the register concurrently.

It will further be apparent that some sort of conventional D.C. holding circuit may be used in place of the even numbered half stages where it is desired to store the information in the shift register indefinitely. Such D.C. holding circuit might be of the type shown in FIGURE 4. In this Figure the same reference numerals are used as in FIGURE 2 to illustrate equivalent circuit elements. It will be seen that this circuit has an input line *m*, an output line *n* and clock input line $S_2$. Thus, the input line would be connected to node points $D_2$, $D_4$, etc., and the output line connected to the gate electrodes of transistor $T_7$, etc., of succeeding odd numbered half stages.

Any sort of convenient holding circuit may be used as is well known in the art such as some sort of flip-flop or multivibrator circuit. Although it would be most advantageous to construct the holding circuit of field-effect transistors for the obvious advantages of mass fabrication as set forth previously in the specification, this would not necessarily have to be done. Reference is made to the text Digital Computers, Components and Circuits by R. K. Richards, 1957, D. Van Nostrand, Co., Inc., New York, N.Y., in which a number of conventional holding circuits for use in various shift registers are clearly illustrated and described (see pages 144–148).

Having thus described the operation of the invention element by element and also by the use of the graphs of FIGURE 3, the previously enumerated advantages of the present circuit will be readily apparent. To summarize, the shift register embodiment of FIGURE 2 allows for the construction of such register using only active devices, i.e., transistors, and only a minimal number of such active devices, i.e., six transistors per shift register stage. This minimal or near minimal number of components per shift register stage both reduces the overall volume required by a shift register constructed of such elements and also obviously will reduce the production costs. The storage capabilities of the device allow it to be run quite slowly without any likelihood of loss of information, thus providing a great deal of delay in a relatively small, inexpensive device. Delay lines capable of providing such delay are far bulkier and more expensive. The fact that no significant current flows directly from supply to ground in this system reduces the power requirements for the bias supply and thus keeps the cost and size of the peripheral circuitry necessary to operate the equipment to a minimum. Finally, and perhaps the most important advantage of the system is its adaptability to mass fabrication techniques since all of the components may be identical and are amenable to high packing densities. This latter advantage is extremely important since current computer fabrication technologies are tending to lean more and more heavily towards completely integrated circuit design.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electric signal storage circuit comprising:

a field-effect storage transistor having gate, source and drain electrodes, means for supplying operating bias voltages to said transistor, means for detecting if said transistor is conductive, means for selectively supplying a reset signal to the gate electrode of said storage transistor capable of rendering same conductive, signal input means for selectively removing said reset signal from the gate electrode of said storage transistor, and means for electrically isolating said gate electrode other than in a sampling period whereby gate electrode to source electrode capacitance inherent in said transistor is effective to store an input signal, said means for selectively supplying the reset signal comprising a reset field-effect transistor and bias voltage means therefor, first clock pulse means for rendering said reset field-effect transistor conductive whereby the gate electrode to source electrode capacitance of said storage transistor will be charged to said bias voltage.

2. An electric signal storage circuit as set forth in claim 1 wherein said signal input means comprises:

an input field-effect transistor having gate, source, and drain electrodes wherein an input signal is connected to the gate electrode thereof, said input signal being effective to selectively remove the bias voltage stored upon the gate electrode to source electrode capacitance of said storage transistor.

3. An electrical signal storage circuit as set forth in claim 2 above wherein the means for isolating the gate electrode of said storage transistor comprises:

an isolation field-effect transistor interposed in the current path between said input transistor and said reset transistor, and second clock means selectively actuable to render said isolation transistor conductive and connect the gate of said storage transistor to said input transistor.

4. An electrical storage circuit as set forth in claim 3 wherein the polarity and magnitude of the bias voltage is such that when said bias voltage is applied to the gate electrode of said storage transistor, renders same conductive.

5. An electric signal storage circuit comprising:

first, second and third field-effect transistors each having gate, source and drain electrodes series connected source electrode to drain electrode, a fourth field-effect transistor having gate, source, and drain electrodes wherein its gate electrode directly connected to a common point between the second field-effect transistor and the third field-effect transistor, means for selectively connecting said fourth field-effect transistor to a suitable bias source, means for detecting the conductive state of said fourth field-effect transistor as determined by a signal appearing on the gate electrode thereof, means for supplying a data signal to the gate electrode of the first field-effect transistor, first clock pulse means for periodically supplying a first clock pulse to the gate electrode of and rendering said third field-effect transistor conductive, and second clock means for supplying a pulse noncoincident with said first clock pulse to the gate electrode of the second field-effect transistor for rendering same conductive coincident with the application of said data signal to the gate electrode of said first field-effect transistor.

6. An electrical signal storage circuit as set forth in claim 5 wherein said first two transistors comprise:

an AND gate effective to short any signal stored on the gate electrode to source electrode capacitance of said storage transistor to ground upon the concurrent application of a suitable pulse to the gate electrode of said first two transistors and wherein said transistors are of the split gate type mounted on a single substrate having two gate electrode connections, a single source electrode connection and a single drain electrode connection.

7. A solid state shift register comprising:

a plurality of bit storage positions, each storage position comprising:

a first and second half stage element, at least the first half stage element of each bit position being comprised of first, second and third source electrode to drain electrode series connected field-effect transistors each having a gate, source, and drain electrode, the first transistor of each half stage element being effective to store a signal on the gate electrode to source electrode capacitance inherent in said transistor, means for connecting the gate electrode of each said first transistors to an output connection from a preceding bit position except the first half stage element in said register, means connecting said transistors of each said half stage element to a suitable bias source, and clock means for supplying a first set of clock pulses to the first half stage elements and a second set of clock pulses to said second half stage elements of each bit storage position for periodically stepping data pulses between alternate even and odd numbered half stage elements of said register.

8. A shift register as set forth in claim 7 wherein the second half stage element of each bit storage position comprises:

first, second and third field-effect transistors each including gate, source, and drain electrodes connected in series source electrode to drain electrode and wherein the gate electrode of the first transistor in each said second half stage element is connected to a point between said second transistor and said third transistor in the preceding half stage element.

9. A shift register as set forth in claim 7 above for storing said second half stage element comprises:

a D.C. holding circuit for storing an input signal applied thereto, said holding circuit being reset by the application of a clock pulse thereto prior to the application of new data.

10. A solid state shift register comprising:

a plurality of bit storage positions, each storage position comprising:

a first and second half stage element, wherein each said half stage element is comprised of first, second and third source electrode to drain electrode series connected field-effect transistors, each having gate, source and drain electrodes, the first transistor of each said half stage functioning as a storage element wherein a signal is stored on the gate electrode to source electrode capacitance inherent in said transistor.

means for connecting the gate electrode of each said first transistor of a half stage element to a point between the source electrode to drain electrode connection between the second transistor and the third transistor of the previous half stage element, means connecting each said third transistor of each half stage element to a suitable bias source, and four phase clock means for supplying pulses to the gate electrodes of said second and third transistors of each bit storage position to periodically step data signals between alternate even and odd numbered half stage elements.

11. A solid state shift register as set forth in claim 10 wherein the first two transistors of each half stage element are of a first conductivity type and the third transistor is of a second conductivity type.

12. A solid state shift register as set forth in claim 11 above wherein the first two transistors are P-channel field-effect transistors and the third transistor is an N-channel transistor.

13. A solid state shift register as set forth in claim 10 wherein said four phase clock includes:

first clock means for applying a first pair of noncoincident pulses to each odd numbered half stage element of said register, and second clock means for supplying a second pair of noncoincident pulses subsequent in time to said first pair of pulses to the even numbered half stage elements of said register and wherein a single cycle of said two clock means is effective to shift a bit of information from one storage position to the next adjacent storage position of said register.

14. A memory circuit comprising a first data input semiconductor field-effect device, means for impressing a data input signal on said first data input device for controlling the conduction thereof, a second data input semiconductor field-effect device, an isolation semiconductor field-effect device interposed between said first and second data input field-effect devices, means for impressing a synchronizing signal on said isolation field-effect device for controlling the conduction thereof between an on state and an off state, said off state of said isolation field-effect device isolating said second data input field-effect device from said first data input field-effect device, said on state of said isolation field-effect device forming a path for discharging an input voltage on said second data input field-effect device, and a load semiconductor field-effect device connected in series with said first data input field-effect device.

15. A memory circuit as claimed in claim 14 and wherein a second load semiconductor field-effect device is connected in series with said second data input field-effect device and wherein means impresses a second synchronizing signal on said second load field-effect device for controlling the conduction thereof, said second synchronizing signal being out of time phase with said first synchronizing signal.

References Cited

UNITED STATES PATENTS 3,215,859 11/1965 Sorchych ----------- 307—88.5

OTHER REFERENCES

Electronics, "New Tecnetrons Switch 15 Amp." by A. Erikson (pages 75 and 77).

ARTHUR GAUSS, Primary Examiner

JOHN ZAZWORSKY, Assistant Examiner

U.S. Cl. X.R.

307—238, 251, 304